United States Patent
Guillen et al.

[11] Patent Number: 6,123,473
[45] Date of Patent: Sep. 26, 2000

[54] BELT DRIVE ARRANGEMENT FOR A PRINTHEAD CARRIAGE

[75] Inventors: Roberto Guillen; Emilio Angulo, both of Barcelona, Spain

[73] Assignee: Hewlett-Packard Company, Fort Collins, Colo.

[21] Appl. No.: 09/352,739

[22] Filed: Jul. 14, 1999

[30] Foreign Application Priority Data

Jul. 16, 1998 [EP] European Pat. Off. ............. 98113230

[51] Int. Cl.[7] ................ B41J 19/00; F16H 7/02; F16G 1/28

[52] U.S. Cl. ............. 400/335; 474/153; 474/252; 400/320; 74/37

[58] Field of Search ................ 400/319, 320, 400/335; 74/37; 474/153, 205, 249, 252

[56] References Cited

U.S. PATENT DOCUMENTS

| | | | |
|---|---|---|---|
| 2,770,977 | 11/1956 | Beckadolph et al. | 474/153 |
| 4,026,162 | 5/1977 | Berg | 474/205 |
| 4,044,882 | 8/1977 | Weinke et al. | 197/82 |
| 4,487,518 | 12/1984 | Enrini | 400/320 |
| 4,571,224 | 2/1986 | Arinaga | 474/153 |
| 4,634,409 | 1/1987 | Johnson et al. | 474/152 |
| 4,715,737 | 12/1987 | Hori | 400/320 |
| 4,761,154 | 8/1988 | Beauchamp et al. | 474/101 |
| 4,804,285 | 2/1989 | Bradford | 400/320 |
| 5,013,286 | 5/1991 | Breher | 474/205 |
| 5,044,797 | 9/1991 | Walker et al. | 400/320 |
| 5,276,970 | 1/1994 | Wilcox et al. | 33/18.1 |

FOREIGN PATENT DOCUMENTS

| | | |
|---|---|---|
| 0 389 741 | 10/1990 | European Pat. Off. . |
| 0 432 604 | 6/1991 | European Pat. Off. . |
| 35 37 464 | 4/1987 | Germany . |
| 58-203257 | 11/1983 | Japan . |
| 58-214053 | 12/1983 | Japan . |
| 63-173676 | 7/1988 | Japan . |
| 06081913 | 3/1994 | Japan . |
| 687 272 | 12/1978 | Switzerland . |

*Primary Examiner*—John S. Hilten
*Assistant Examiner*—Leslie J. Grohusky

[57] ABSTRACT

A reciprocating belt drive arrangement for the printhead carriage of a printer comprises an endless belt looped around a toothed drive pulley, which engages a toothed part of the belt, and an idler pulley with circumferential grooves which are arranged to receive ribs on the remaining part of the belt to prevent transverse movements of the belt leading to wear. The ribs and grooves may be interchangeable. In an alternative embodiment the toothed and ribbed parts extend side-by-side along the belt.

13 Claims, 2 Drawing Sheets

BELT DRIVE ARRANGEMENT FOR A PRINTHEAD CARRIAGE

The present invention relates to a belt drive arrangement, in particular of the type used in printers.

In prior art belt drives, both a motor drive pulley and the internal surface of a looped belt have their surfaces configured, e.g. by toothing, such that they ensure a secure mutual grip. In printers, such belts are used to achieve reliable drive and accurate positioning for the scan axis. The motor drive pulley is located at one end of the scan axis. At the other end of the scan axis there is located an undriven idler pulley that simply acts as a tensioner; conventionally, the idler pulley has a flat surface since no grip on the belt is required.

Belt drives of the above type are disclosed in U.S. Pat. Nos. 4,761,154 and 5,276,970.

A problem with such prior art belt drives is that, unless the drive and idler pulleys are relatively close together, movement of the belt in a direction transverse of the scan axis arises at the idler pulley. As a result the belt rubs against the flanges of the idler pulley producing undesired wear of both the belt and the pulley, which eventually leads to unsatisfactory operation of the system.

The present invention seeks to overcome or reduce the above problem.

According to a first aspect of the invention, there is provided a belt drive arrangement comprising a drive pulley, an idler pulley and a drive belt which engages both the pulleys and is arranged to be driven by the drive pulley, characterised in that a first part of the belt is configured to be driven by the drive pulley and a second part of the belt is configured to restrict lateral movements of the belt as it is driven.

An advantage of the above described arrangement is that transverse movement of the belt in the region of the idler pulley is avoided. This reduces wear of the belt. In addition operation of the belt drive involves less vibrations and this is quieter.

The arrangement is preferably a reciprocating belt drive arrangement in which the belt is arranged to be driven backwards and forwards by the drive pulley in which case a single first part extends along one portion of the length of the belt and a single second part extends along another portion of the length of the belt. Each portion preferably constitutes substantially half of the length of the belt.

Alternatively, the first and second parts may extend next to each other in mutually parallel fashion along substantially the entire length of the belt. This arrangement has the advantage that no limitations are imposed on the longitudinal movement of the belt; in particular the drive arrangement does not need to be reciprocating.

The first part of the belt is preferably toothed for engagement with toothing on the drive pulley.

According to a second aspect of the present invention there is provided a belt drive arrangement comprising a drive pulley, an idler pulley and a drive belt which is looped around both pulleys and which is arranged to be driven by the drive pulley, characterised in that the idler pulley has one or more circumferential grooves and/or ribs and in that the face of the belt facing the pulleys is divided into first and second parts, the first part having a surface configured for driving engagement with the drive pulley and the second part having one or more longitudinally-extending ribs and/or grooves respectively for engagement with the idler pulley. An additional advantage of such an arrangement in that, in view of the engagement between the grooves and the ribs, the idler pulley no longer requires flanges to retain the belt thereon.

According to a third aspect of the present invention there is provided an endless drive belt in the form of a loop with opposed outer and inner surfaces, characterised in that the inner surface is divided into first and second parts located relatively longitudinally of each other, the first part having means for producing a longitudinal drive effect and the second part having one or more longitudinally-extending ribs or grooves.

Preferred embodiments of the present invention will now be described, by way of example only, with reference to the accompanying drawings, of which:

Figure 1:
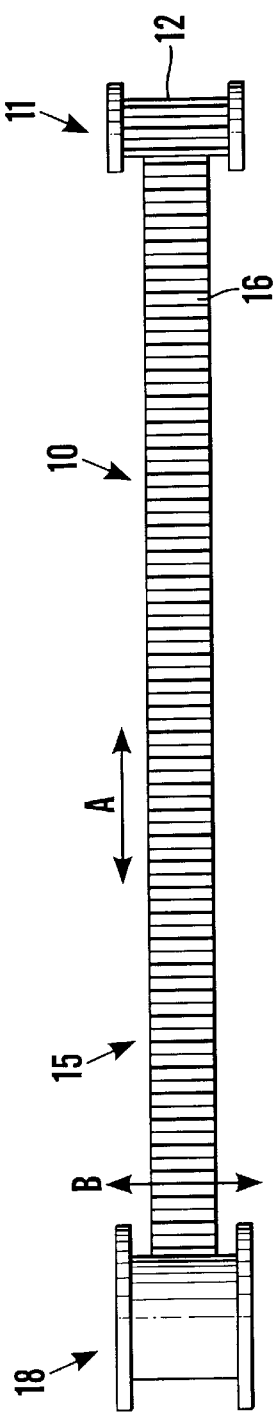
FIG. 1 shows a prior art belt drive arrangement.

Referring to the drawings, FIG. 1 shows a known belt drive arrangement 10 as employed in printers to drive printhead carriages in the scan axis direction. Arrangement 10 comprises a motor drive pulley or roller 11 with a toothed drive surface 12, which drivingly engages the internal surface 16 of a belt 15. (The return length of the belt nearer to the observer in FIG. 1, has been omitted for reasons of clarity). Internal surface 16 has transversely-extending teeth having a constant profile along the entire length of the belt.

In use, pulley 11 is driven alternately in one sense and then the other to drive the belt in a reciprocating manner as indicated by arrow A, so as to move the printhead back and forth across the print medium in the direction of the scan axis. Since no power transmission occurs at the idler pulley 18, its surface is, in practice, substantially flat. Accordingly, the belt undergoes unwanted up and down movement, as indicated by arrow B, and this causes wear of belt 15 and pulley 18.

Figure 2:
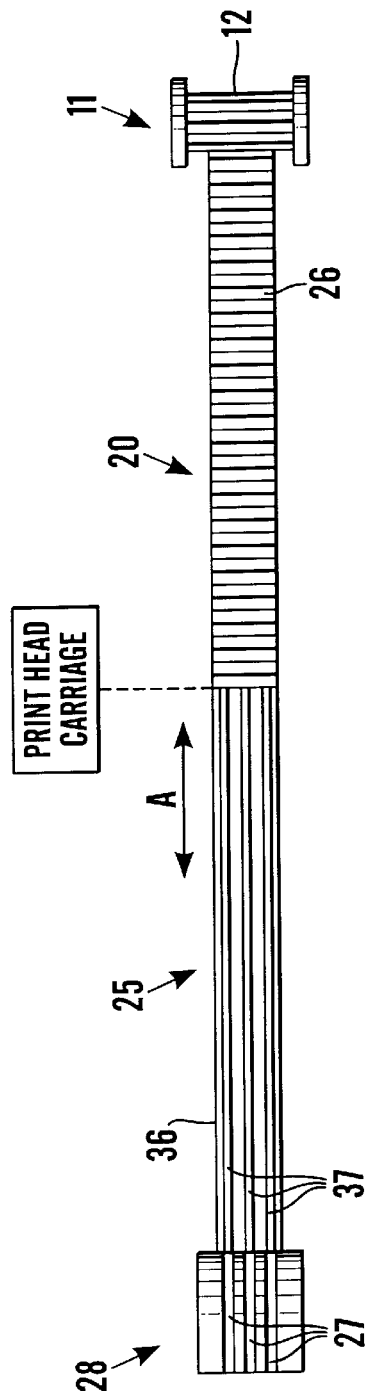
FIG. 2 shows a belt drive arrangement in accordance with a first embodiment of the present invention.

Referring now to FIG. 2, there is shown a belt drive arrangement 20 in accordance with a first embodiment of the present invention. Again, motor drive pulley 11 has a toothed surface 12. However, idler pulley 28 has three circumferential grooves 27. In addition, the length of drive belt 25 is divided into two halves. A first half 26 is provided with teeth similar to those of belt 15 for engagement with pulley 11. However, the second half 36 is provided with three longitudinal ribs 37 at a spacing corresponding to the spacing between grooves 27. In use, as belt 25 reciprocates as indicated by the arrow A, a part of the toothed half 26 remains in contact with the drive pulley 11 and a part of the ribbed half 36 remains in contact with the idler pulley 28. Thus the belt is driven as in the prior art arrangement, but at the same time, ribs 37 remain in engagement with respective grooves 27 so that there is no up and down movement, i.e in a direction transverse to the length of the belt.

Figure 3:
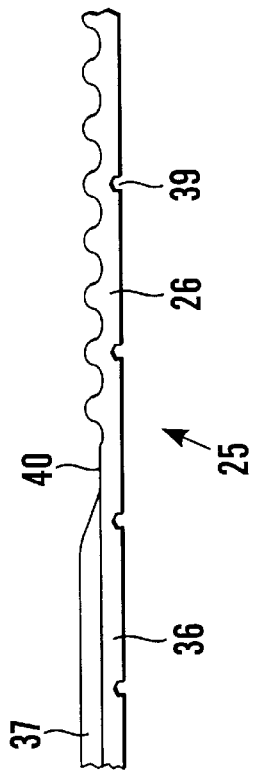
FIG. 3 and 4 are enlarged sectional views of part of the belt of the arrangement of FIG. 2.

A typical belt 25 is made of black polyurethane with a Shore hardness of 80 to 83 and reinforced with fibres, in particular kevlar reinforcement cords placed inside the polyurethane. For use in a printer, the belt has a total length of approximately 3005 mm and its first half has 737 lateral teeth with a spacing of 2.03 mm. As shown in FIG. 3, the opposite side of belt 25 is provided along its entire length with recesses 39 at a spacing of 6.10 mm corresponding to every third tooth. Recesses 39 are present to locate and support the kevlar cords during manufacture, in particular when inside a mould before and during injection of the polyurethane, but they also facilitate flexing of belt 25 around the pulleys 28 and 11. FIG. 3 shows the region of the belt 25 at one of the junctions 40 of the two halves 26 and 36. The limits of travel of the printhead and the position and length of the belt are selected so that at no time does either of the junctions 40 reach either of the pulleys 28, 11.

Figure 4:
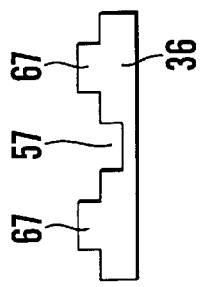

FIG. 4 shows a sectional view of the ribbed half 36 of belt 25. The transition between the teeth (on first half 26) and the ribs 37 (on second half 36) affects only the polyurethane, and the belt does not lose continuity at this point.

Figure 5:
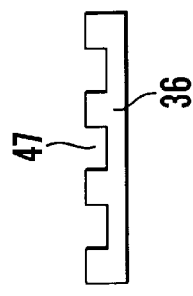
FIGS. 5 and 6 are views similar to FIG. 4 of modified belts.
Figure 6:
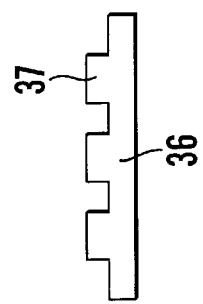
Figure 7:
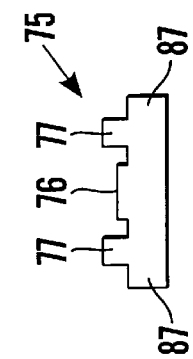
FIGS. 7 and 8 show the drive and idler pulleys respectively of a belt drive arrangement in accordance with a second embodiment of the present invention.
Figure 8:
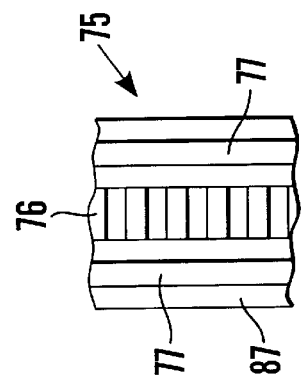
Figure 9:
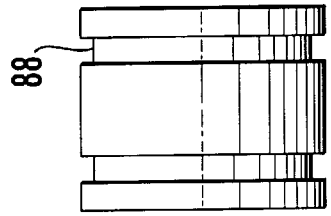
FIGS. 9 and 10 are plan and sectional views of the belt used in the second embodiment.
Figure 10:
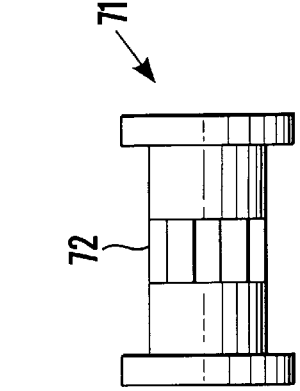

Various modifications can be made to the above described arrangement. For example, the idler pulley 28 may have ribs, in which case grooves 47 are provided along the surface of part 36 of the belt as shown in FIG. 5. Whichever arrangement is adopted, the number of ribs and associated grooves may be one, two or more than three. The idler pulley 28 and the part 36 may each be provided with a rib/groove combination; for example, if pulley 28 has a central rib and two side grooves, the part 36 has a central groove 57 and two side ribs 67 as shown in FIG. 6.

Moreover, for printheads with reduced limits of travel, the toothed part 26 and the ribbed/grooved part 36 may extend over less than half of the total length of the belt. Instead of being continuous at both ends, parts 26, 36 could be separated by one or two regions with a flat surface.

The toothing 12 of the drive pulley 11 and the toothing on part 26 of the belt may be replaced by any other intergaging arrangements or by frictional surfaces provided that a drive effect is produced in the longitudinal direction of the belt. For example, studs on the pulley could engage in recesses in the belt, or vice versa. Any suitable material may be used for the belt 25, and recesses 39 may be omitted.

The pulley axes may be arranged horizontally rather than vertically.

FIGS. 7 to 10 show the elements of a second embodiment of the invention in which the respective parts of the belt for driving and centring are arranged side-by-side instead of end-to-end. A drive pulley 71 has toothing 72 restricted to a central region thereof. The idler pulley 78 has circumferential grooves 88 located in the edge regions thereof. In this embodiment the drive belt 75 is conveniently of uniform construction throughout its length and comprises a toothed central region 76, for engagement with toothing 72, and ribs 77 at its edge regions 87 for engagement with grooves 88 to restrict lateral movement of the belt.

An advantage of this arrangement is that reciprocation of the belt is not restricted to part of its length. Indeed, this embodiment is not limited to reciprocating arrangements at all.

Various modifications may be made to the above-described second embodiment. For example, as with the first embodiment, the grooves 88 and ribs 77 may be provided in any convenient number and may be interchanged as desired. A single toothed region 76 adjacent one edge of the belt 75 may extend parallel to a single ribbed and/or grooved region 87 adjacent the other edge of the belt. Alternatively, two toothed regions 76 adjacent the edges may be separated by a single grooved/ribbed region. Again the toothing may be replaced by another suitable intergaging or frictional arrangement.

What is claimed is:

1. A belt drive arrangement comprising:
   a drive pulley;
   an idler pulley comprising a first engaging means disposed circumferentially about said idler pulley; and
   a drive belt looped around both said pulleys, said drive belt comprising a surface facing both said pulleys, said surface comprising a first part configured for reciprocating driving engagement with said drive pulley and a second part comprising a second engaging means disposed longitudinally along said surface for engaging with said first engaging means,
   wherein said first part extends along a first lengthwise portion of said drive belt, and said second part extends along a second, different lengthwise portion of said drive belt.

2. A belt drive arrangement according to claim 1, wherein said drive belt has a length, and wherein said first lengthwise portion is substantially a first half of said length, and said second lengthwise portion is substantially a second half of said length.

3. A belt drive arrangement according to claim 1, arranged to drive a driven member between limit positions which correspond to said drive pulley engaging relatively-spaced locations on said drive belt which are both within said first part.

4. A printer comprising a belt drive arrangement according to claim 3, said driven member is a printhead carriage.

5. A belt drive arrangement according to claim 1, wherein said drive pulley has a toothing, and said first part of said drive belt surface is also toothed.

6. A belt drive arrangement according to claim 1, wherein said first engaging means comprises a groove and said second engaging means comprises a rib.

7. A belt drive arrangement according to claim 1, wherein said first engaging means comprises a rib and said second engaging means comprises a groove.

8. An endless drive belt in a loop configuration, comprising:
   a surface comprising a first part and a second part, said first part comprising means for producing a longitudinal drive effect and said second part comprising an engaging means disposed longitudinally along said surface,
   wherein said first part extends along a first lengthwise portion of the drive belt, and said second part extends along a second, different lengthwise portion of the drive belt.

9. An endless drive belt according to claim 8, wherein said means for producing a longitudinal drive effect comprises a plurality of teeth extending transversely of the belt.

10. An endless drive belt according to claim 8, wherein said first and second parts have substantially the same length.

11. An endless drive belt according to claim 8, wherein the drive belt has a length, and wherein said first lengthwise portion is substantially a first half of said length, and said second lengthwise portion is substantially a second half of said length.

12. An endless drive belt according to claim 8, wherein said engaging means comprises a groove.

13. An endless drive belt according to claim 8, wherein said engaging means comprises a rib.

* * * * *

UNITED STATES PATENT AND TRADEMARK OFFICE
CERTIFICATE OF CORRECTION

PATENT NO.: 6,123,473

DATED: September 26, 2000

INVENTORS: Roberto Guillen and Emilio Angulo

It is certified that error appears in the above-identified patent and that said Letters Patent is hereby corrected as shown below:

Column 1, page 1, in the title delete "FOR A PRINTHEAD CARRIAGE" so that the title reads --BELT DRIVE ARRANGEMENT--.

Column 4, claim 4, line 26, delete "3, said" and insert --3, wherein said--.

Signed and Sealed this

First Day of May, 2001

*Attest:*

NICHOLAS P. GODICI

*Attesting Officer*   *Acting Director of the United States Patent and Trademark Office*